Sept. 24, 1968          D. R. HERRIOTT          3,402,633
LONG PATH MULTIPLE BEAM INTERFEROMETER
Filed March 30, 1965
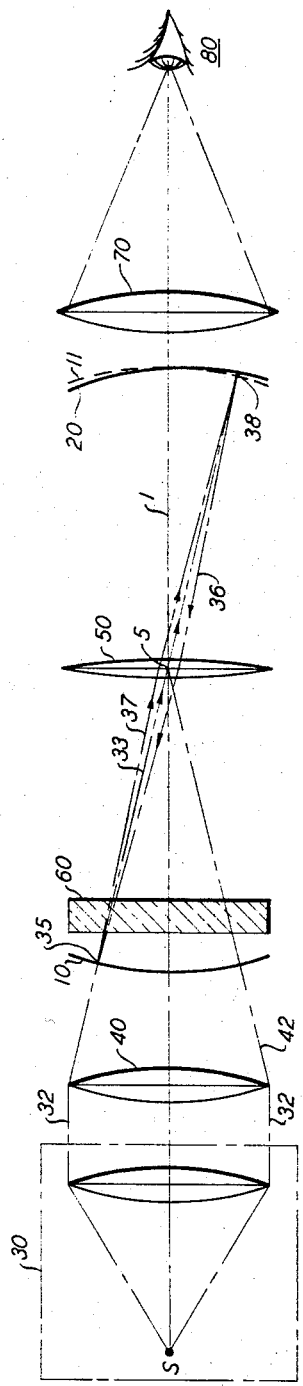
INVENTOR
D. R. HERRIOTT
BY John X. Mullavney
ATTORNEY United States Patent Office 3,402,633
Patented Sept. 24, 1968

3,402,633
LONG PATH MULTIPLE BEAM INTERFEROMETER
Donald R. Herriott, Morris Township, Morris County, N.J., assignor to Bell Telephone Laboratories, Incorporated, New York, N.Y., a corporation of New York
Filed Mar. 30, 1965, Ser. No. 443,837
7 Claims. (Cl. 88—14)

This invention relates to interferometry and more particularly to a multiple beam type interferometer with a large spacing between the interferometer plates.

Multiple beam interferometry is one of the more precise methods of inspecting surface contours and the homogeneity of optical materials. The physical principle on which inspection by multiple beam interferometry is based is the phenomenon of interference by multiple reflected light rays which are out of phase. A particularly popular method of such inspection relies on the examination of the interference patterns created by the multiple reflections of light impingent upon a tilted plate multiple beam type interferometer. In this method the surface to be inspected forms one of the reflecting plates of the interferometer, or alternatively the material whose homogeneity is to be examined is located within the very narrow space between the tilted plates.

The technique of using tilted plate multiple beam type interferometers to study surface contours and material homogeneity and the interpretation of the resulting interference fringe patterns is discussed extensively in the literature; see, for example, "Surface Microtopography" by S. Tolansky, Interscience Publishers (1960) pages 1–29.

The use of a tilted plate multiple beam type interferometer for studying surfaces and medium homogeneity is limited, however, to small plate spacings generally no more than a few millimeters. This close spacing is necessary to minimize the phase error between the multiple reflections and the "walk off" effect of the multiple reflections of the beam between the two slightly angled interferometer plates. These effects must be minimized in order to obtain an interference fringe pattern having high "finesse," i.e., fringes with a narrow width compared to their spacing.

In a tilted plate multiple beam type interferometer the incident light beam is normal to one of the interferometer plates and at a small wedge angle to the normal of the other plate; thus, the angle which the successly reflected beam makes with the normal of the respective interferometer plates increases with each successive reflection, and the path difference between consecutive reflections also increases with successive reflections. Now because of this angular increase, the incident light beam which is successively reflected between the plates, tends to move or "walk off" across the plate surface and the phase difference between successive beams increases thereby destroying the finesse of the fringe pattern. For this reason the definition of the fringe pattern may be rendered so inferior so as to be incapable of sensible interpretation. As the spacing between interferometer plates becomes larger, the maximum permissible wedge angle of necessity becomes smaller and more critical. This angle is critical at large spacings because at any particular angle the lateral displacements of the "walk off" and the phase errors increase as the spacing between the interferometer plates increases.

Multiple beam fringe patterns have been obtained at large plate spacings using the standard tilted plate multiple beam interferometer by severely limiting the permissible wedge angle. See, for instance, "Tilted Plate Interferometry with Large Plate Separations" by Moos, Imbusch, Mollenauer and Schawlow in Applied Optics, vol. 2, No. 8, August 1963, pages 817–822. However, the multiple beam fringes obtained therein are generally unsuitable because the finesse of the fringe pattern is of poor quality and the small wedge angle needed between the plates has reduced the pattern to only one or two fringes across the entire field.

The principal object of the present invention is to obtain sharply defined interference fringe patterns of high contrast with large spacings between the respective interferometer plates.

Another object of the present invention is to generate multiple reflections of the incident light beam without any "walking off" or phase errors of the successive reflections of the light beam.

These and other objects are obtained in accordance with the present invention by a multiple beam type interferometer having two concave spherical mirror surfaces disposed such that their centers of curvature substantially coincide. One of the mirror surfaces is slightly tilted with respect to the other. A thin lens is positioned in the interferometer cavity between the mirrors to image one mirror surface onto the other, and vice versa. One of the mirror surfaces is illuminated by an external monochromatic light source with light rays normally incident to the mirror surface. The medium whose homogeneity is to be examined is placed in the interferometer cavity preferably in close proximity to one of the mirror surfaces. Because one mirror surface is imaged onto the other, successive reflections of the multiple light rays do not walk across the mirror surfaces and the phase retardation of successive beams is constant so high contrast interference fringe patterns are obtained.

As an alternative to tilting the mirror, the mirror may be linearly displaced such that the respective centers of the mirrors are separated along the axis of the interferometer cavity. This embodiment, however, creates a fringe pattern that is less useful for the inspection of contours and homogeneity than that of the tilted mirror embodiment.

In accordance with a feature of the invention, and in addition to the inspection of material homogeneity, the above-described arrangement can also be utilized for the inspection of the surface contours of various optical apparatus components, e.g., spherical reflectors. To this end, the reflecting surface to be inspected would comprise one of the aforementioned mirror surfaces, while a standard or reference reflecting surface would comprise the other. The resultant interference fringes will then provide an indication of how close the surface under test approaches the standard.

The invention may be more fully apprehended from the following detailed description of an illustrative embodiment disclosed in a schematic ray diagram in the drawing.

Referring now to the accompanying drawing, two concave spherical mirrors 10 and 20 are shown disposed along an optic axis 1. Each of the mirrors 10 and 20 has a transreflective surface which partially transmits and partially reflects the incident light rays. Reflective coating techniques for making transreflective surfaces are well known in the art. A description of the necessary characteristics and suitable techniques of depositing such a coating is disclosed, for instance, in "Surface Microtopography" supra, pages 25–27.

The two mirrors 10 and 20 as shown in the accompanying figure are of equal radii. As a matter of convenience it is somewhat easier to construct an interferometer in accordance with the invention by using similar spherical mirrors; however, as will be more evident from the explanation to follow, mirrors having different radii can in fact be used herein. The mirrors 10 and 20 are positioned so that their respective centers of curvature are located substantially coincident with each other near point 5. The mirror 20, however, is slightly tilted with respect to the spherical surface indicated by the dotted line 11 which may be generated by the radius of mirror 10. It is because of this tilting that the respective centers of curvature of the mirrors 10 and 20 are not precisely coincident. It should be understood that the tilting of mirror 20 is very slight being an actual deflection displacement of a few millimeters or less.

As an alternative to the tilting of mirror 20, the mirror may be slightly linearly displaced along the optic axis. Such a modification will be obvious to those skilled in the art and it is not believed necessary to discuss it in detail.

An illumination source 30, external to the interferometer cavity, is located on the optic axis 1. While this illumination source is shown symbolically as a monochromatic point source with a collimating lens, the most suitable source is an optical maser source. A suitable optical maser source for use in the present invention is disclosed in the aforementioned article entitled "Tilted Plate Interferometry with Large Plate Separations." Because of the long path which the light must travel within the interferometer cavity, the coherence length of the light source must be equal to the product of the length of the cavity and the number of contributing beams. The expression monochromatic light beam is intended to include any beam having light rays of one or more monochromatic wavelengths.

When more than one monochromatic wavelength is used in this interferometer, more than one fringe pattern is observed. By making the laser cavity in the optical maser of the light source 30 N times as long as the interferometer plate spacing, the spacing of the separate wavelengths of the light output of the illumination source will produce N equally spaced fringes for each λ/2 path difference in the fringe pattern, as is shown in more detail in my Patent 3,145,252 which issued Aug. 18, 1964.

A lens 40 is positioned to intercept the collimated monochromatic light beam 32 before it strikes the transreflective surface of the mirror 10. The focal point of the lens 40 is coincident with the center of curvature of the mirror 10, which is the point 5. As a result, the incident light rays form a spherical wave front concentric to the spherical surface of the mirror 10 and hence the light rays are directed onto the spherical mirror 10 normal to the transreflective surface of the mirror. It is to be understood that the combined action of the lens 40 and the illumination source 30 is only one method of illuminating the mirror surface with normally incident light rays. Many alternative methods will suggest themselves to those skilled in the art without departing from the spirit and scope of applicant's invention.

A thin lens 50 is positioned within the cavity formed by the spherical mirrors 10 and 20 to image each of the respective mirrors onto the surface of the other. The location of the lens 50 is, of course, at the point 5 where the respective centers of curvature of the mirrors substantially coincide. It is desirable that a lens be used that will image one mirror surface onto the other without aberrations and also redirect all the light diffracted from a spot on one mirror to a spot on the other mirror without aberrations. It is to be understood that while in the illustrative embodiment a single lens is shown to image one mirror onto the other, obvious alternative means including the use of multielement imaging means will immediately suggest themselves to those skilled in the art.

The optical medium 60, whose index homogeneity is to be inspected, is placed in the cavity between the two mirrors 10 and 20, preferably close to one of the mirror surfaces in order that successive reflections of the light rays may penetrate approximately the same portion of the medium. The medium may be inserted on either side of the lens 50 or on both sides as desired. The medium 60 may comprise an optically transparent crystal, a gas volume, plasma, glass, a brewster angle window, or some other optical material. If the index homogeneity of a volume of gas is to be examined, the same can fill the entire interferometer cavity between the concave mirrors.

Because of the long path of the multiple reflections within the interferometer, relatively thick materials may be examined as contrasted with that permitted by the thin spacing between typical tilted plate multiple beam interferometers. It is to be understood that the use of the instant interferometer is not limited to the inspection of materials inserted within the cavity, but as will be clear hereinafter it may also be used to examine the surface contour of a material shaped to form one of the mirror surfaces.

The illuminating light rays 42 being normally incident to the surface of the mirror 10 converge at its center of curvature. For illustrative purposes the performance of a hypothetical single light beam projected along the path 33 of the incident light rays will be described. The light beam projected along the path 33 penetrates the mirror surface 10 at point 35 creating thereon an illuminated spot. This light beam will pass through the optical medium 60 which is being inspected. This light beam initially traverses the path 33 and is imaged by the lens 50 onto the surface of the mirror 20, creating thereon an illuminated spot at point 38. The mirror 20 then reflects the light beam along the path 36.

The conjugate spot at point 38 is imaged by the lens 50 onto the mirror 10 at the exact location of the original illuminated spot at point 35. This in turn is reimaged on mirror 20 via the light path 37. Each succesive reflection of the light beam will traverse a different path 36, 37, etc., because the mirror 20 is slightly tilted. However, the successive traverses of this light beam will always be imaged at the same conjugate illumination spots 35 and 38, respectively. It is to be understood that the path differences shown in the figure are greatly exaggerated. The actual path differences are very slight being in the range of millimeters. Succesive reflections of the beam 33 will traverse substantially the same portion of the medium 60 if it is located close to one of the mirror surfaces 10 or 20.

As will be evident to those skilled in the art, interference fringes are developed by virtue of the multiply reflected light beam. These interference fringes are similar to those developed by the prior art tilted plate interferometers. However, in the present arrangement the repeated passes do not cause the beam to shift in position on the mirrors, but after each reflection from the tilted mirror, the angle of the beam is increased. Thus the output contribution from this long path arrangement is equivalent to those from a conventional interferometer arrangement working at zero spacing.

A collecting lens 70 gathers and focuses the resultant fringe pattern onto a viewing means 80 whereby the pattern produced by the interference of the light beams can be observed. The viewing means may comprise photographic apparatus, or the naked eye, or any other viewing means known in the art.

The field pattern of the interference fringes in the titled plate arrangement comprises a plurality of linear fringes substantially parallel to each other. The distortions of these fringes indicate imperfections of the material homogeneity, or surface contour, being studied. The interpretation of these fringe contour patterns is discussed extensively in the literature. See, for example, "Surface Microtopography," supra.

In the case of the linearly displaced mirror the field pattern of the interference fringes comprises a plurality of concentric fringes. Their interpretation is well known to those skilled in the art and need not be discussed in detail.

As indicated hereinbefore, the described and illustrated interferometer arrangement can also be utilized for the inspection of the surface contours of various optical apparatus components such as spherical reflectors. In this case, the mirror surface 20 would comprise the spherical reflector under test, while the mirror surface 10 would comprise a standard or reference reflector. Interference fringe patterns are developed in essentially the same manner as described and the same will provide an indication of the surface contours of the test reflector and how closely it matches the standard.

Numerous modifications and/or new uses of the described arrangement will suggest themselves to those skilled in the art. For example, one obvious modification is to use the instant interferometer to inspect a lens placed in its cavity for aberrations by measuring the growth in spot size on different areas of the mirror. This method would be particularly advantageous in the inspection of gas lenses such as are used in laser light guides. Accordingly, it is to be understood that the above-described arrangement is merely illustrative of the principles of the present invention and variations therein may be devised by those skilled in the art without departing from the spirit and scope of the invention.

What is claimed is:

1. An interferometer comprising two transreflective spherical concave mirrors of common curvature spaced apart a distance substantially equal to the sum of their radii of curvature, a lens internal to the cavity formed by said mirrors positioned with respect to each mirror to permit the lens to image the surface of each mirror onto the surface of the other mirror, one mirror being tilted with respect to the other in order to produce an interference pattern whereby the multiple reflections of the light rays pass through different parts of the lens and are respectively imaged to the same points on the two mirrors, and illumination means external to said cavity to irradiate one of the mirror surfaces with monochromatic light rays perpendicular to its inner surface.

2. In combination, a first and second concave spherical mirror having transreflective surfaces, said first and second mirrors being located in contraposition to each other to form an optical cavity and being separated by a distance being substantially equal to the sum of their respective radii, said second mirror being tilted with respect to the spherical surface generated by the radius of said first mirror, an illumination source generating light rays with a spherical wave front converging to the center of curvature of said first mirror including a collimated beam of monochromatic light and a first lens whose focal point is coincident with the center of curvature of said first mirror and positioned external to said cavity and between said collimated light beam and said first mirror, and a second lens located in said cavity to image illuminations on the surface of one mirror onto the surface of the other mirror whereby the multiple reflections of the light rays each pass through different parts of the second lens.

3. The combination claimed in claim 2 wherein the succesive reflections of a ray of light perpendicularly incident to the surface of one of said mirrors reflects from conjugate spots on said first and second mirrors regardless of the number of reflections within the cavity.

4. An interferometer comprising two transreflective spherical concave mirrors spaced apart along an optic axis at a distance substantially equal to the sum of their individual radii of curvature, a lens internal to the cavity formed by said mirrors, said lens imaging the surface of one mirror onto the surface of the other mirror, one mirror being dislocated such that its center of curvature is slightly dipslaced from the locus of the center of curvature of the other mirror whereby the reflections of each light ray between different conjugate spots on said two spherical concave mirrors traverse a different optical path in said cavity, and illumination means external to said cavity to irradiate one of the mirror surfaces with monochromatic light rays perpendicular to its inner surface.

5. The interferometer as claimed in claim 4 wherein said one mirror is dislocated such that its center of curvature is linearly displaced along said optic axis from the center of curvature of said other mirror.

6. In combination, a first concave spherical mirror of radius $R_1$, a second concave spherical mirror of radius $R_2$, said first and second mirrors positioned along an optic axis and separated by a distance of $R_1 + R_2$, the center of curvature of said first mirror falling on said optic axis, said second mirror tilted with respect to said first mirror so that its center of curvature is displaced slightly from said optic axis yet proximate to the center of curvature of said first mirror, a lens intermediately located in the cavity between said first and second mirrors, said lens imaging each of said mirrors onto the other whereby the successive reflections of each light ray in said cavity between different conjugate spots on said first and second spherical mirrors traverse a different path, illumination means external to said cavity and serving to generate monochromatic light rays parallel to said optic axis, a second lens located on said optic axis and interposed between said illumination means and the first spherical mirror, the focal point of said second lens being coincident with the center of curvature of said first mirror, and material whose homogeneity is to be examined adapted to be located symmetrically about said optic axis within said cavity.

7. An interferometer arrangement comprising optical interforemeter reflectors having curved reflecting surfaces symmetrical about the optic axis with one of said interferometer reflectors being tilted with respect to the interferometer reflector, optical imaging means located in the cavity between said interferometer reflectors to image the surface of said one reflector upon the surface of said other reflector whereby the succesive reflections of each light ray between different conjugate spots on the two interferometer reflectors traverse a different optical path through said optical imaging means, and means external to said cavity to illuminate the interferometer cavity with monocromatic light rays normal to the inner reflecting surface of one of the interferometer reflectors.

References Cited

UNITED STATES PATENTS

| | | | |
|---|---|---|---|
| 3,055,257 | 9/1962 | Boyd et al. | 331—94.5 |
| 3,286,193 | 11/1966 | Koester et al. | 331—94.5 |
| 3,293,565 | 12/1966 | Hardy | 331—94.5 |

JEWELL H. PEDERSEN, *Primary Examiner.*

B. J. LACOMIS, *Assistant Examiner.*